US006187892B1

(12) United States Patent
Markusch et al.

(10) Patent No.: US 6,187,892 B1
(45) Date of Patent: Feb. 13, 2001

(54) METHOD OF MAKING A COATED SUBSTRATE WITH POLYURETHANE/UREA CONTACT ADHESIVE FORMULATIONS AND THE COATED SUBSTRATE BY THIS METHOD

(75) Inventors: Peter H. Markusch, McMurray, PA (US); James W. Rosthauser, Glendale; Robert L. Cline, Panden City, both of WV (US)

(73) Assignee: Bayer Corporation, Pittsburgh, PA (US)

(*) Notice: Under 35 U.S.C. 154(b), the term of this patent shall be extended for 0 days.

(21) Appl. No.: 08/483,349

(22) Filed: Jun. 7, 1995

(51) Int. Cl.[7] .................................................. C08G 18/48
(52) U.S. Cl. .............................. 528/68; 528/76; 528/77; 528/79; 528/905; 428/423.1; 427/385.5; 427/389.9
(58) Field of Search ................. 528/68, 76, 77, 528/79, 905; 428/423.1; 427/385.5, 389.9

(56) References Cited

U.S. PATENT DOCUMENTS

| | | | |
|---|---|---|---|
| 3,779,794 | 12/1973 | DeSantis | 117/72 |
| 3,979,364 | 9/1976 | Rowton | 260/77.5 AM |
| 4,156,064 | 5/1979 | Falkenstein et al. | 528/46 |
| 4,624,996 | 11/1986 | Rizk et al. | 525/453 |
| 4,625,012 | 11/1986 | Rizk et al. | 528/28 |
| 4,743,672 | 5/1988 | Goel | 528/44 |
| 4,994,540 | 2/1991 | Boerner et al. | 528/44 |
| 5,102,714 | 4/1992 | Mobley et al. | 428/95 |
| 5,141,967 * | 8/1992 | Mafoti | 521/159 |
| 5,204,439 | 4/1993 | Dormish et al. | 528/44 |
| 5,227,409 | 7/1993 | Mobley et al. | 521/167 |
| 5,389,430 * | 2/1995 | Yilgör et al. | 428/246 |

* cited by examiner

*Primary Examiner*—Rachel Gorr
(74) *Attorney, Agent, or Firm*—Joseph C. Gil; N. Denise Brown

(57) ABSTRACT

The present invention relates to a method of making a coated substrate that requires a polyurethane/urea contact adhesive, and the coated substrates produced by this method. This invention requires a) a polyisocyanate with a functionality of less than about 4, b) optionally, a polyol blend consisting of about 95 to 100% polyether polyols with molecular weights from about 1800 to 12000 and average functionality from about 1.5 to about 4 and up to about 5% of chain extenders with molecular weights from about 60 to 400 and average functionality from about 1.5 to about 3, and c) polyethers having at least two isocyanate reactive groups and a molecular weight of from about 1800 to about 12000 and average functionality from about 1.5 to about 4 in which at least 50% of the isocyanate reactive groups are primary and/or secondary amino groups. The weight ratio of components b) to component c) ranges from about 95:5 to about 0:100, and the amounts of components a), b), and c) are such that the equivalent ratio of isocyanate groups to isocyanate-reactive groups is from about 85:100 to about 115:100 and the sum of the urethane group content plus the urea group content is from about 1 to about 12%.

13 Claims, No Drawings

METHOD OF MAKING A COATED SUBSTRATE WITH POLYURETHANE/UREA CONTACT ADHESIVE FORMULATIONS AND THE COATED SUBSTRATE BY THIS METHOD

BACKGROUND OF THE INVENTION

The present invention relates to a method of producing a coated substrate with an adhesive composition. This invention requires a contact adhesive which is a polyurethane/urea composition consisting essentially of a) a polyisocyanate with a functionality of less than about 4, optionally, b) a polyol blend consisting of 1) about 95 to 100% polyether polyols with molecular weights from about 1800 to 12000 and average functionality from about 1.5 to about 4, and 2) up to about 5% of chain extenders with molecular weights from about 60 to 400 and average functionality from about 1.5 to about 3, and c) polyethers having at least two isocyanate reactive groups and a molecular weight of from about 1800 to about 12000 in which at least 50% of the isocyanate reactive groups are primary and/or secondary amino groups. The weight ratio of components b) to component c) ranges from about 95:5 to about 0:100, and the amounts of components a), b), and c) are such that the equivalent ratio of isocyanate groups to isocyanate-reactive groups is from about 85:100 to about 115:100 and the sum of the urethane group content plus the urea group content is from about 1 to about 12%. Substrates suitable for use in the present invention are preferably porous, flexible substrates. Coated substrates produced by this method are also the subject of the present invention.

Polyurethane adhesives and sealants of various types are well known. See, for example, U.S. Pat. Nos. 3,779,794, 4,156,064, 4,624,996, and 4,625,012.

In certain applications, it is desirable to provide an elastomeric material that can be applied to a flexible substrate in the liquid state and cured to provide an adhesive layer. This allows this flexible substrate to be attached to and in some cases subsequently removed from another surface.

Materials of this type are described in, for example, U.S. Pat. Nos. 5,102,714 and 5,227,409. These patents relate to adhesives for adhering carpet onto flooring based on a) a polyol mixture having an average functionality of 2.2 or less and equivalent weight of at least 500 and containing from 10 to 70 mole percent of monoalcohol and optionally up to 10% of a chain extender with an equivalent weight of from about 30 to 500, with b) a polyisocyanate mixture having an average functionality of about 2.2 or less.

Adhesives of this type are not useful for certain flexible substrates that are porous, such as, for example, textiles and other woven or nonwoven natural or synthetic fibers, paper and paper products, leather, or wood. When applying the adhesive materials in the liquid state onto these porous substrates, the reacting adhesives have a tendency to soak into the interior of the substrate before the adhesive can be cured. Because most of the applied adhesive is thus not on the surface of the substrate, the effectiveness of the cured adhesive is severely limited.

Adhesives containing high molecular weight amine terminated polyethers (ATPEs) are known. U.S. Pat. Nos. 4,743,672, 4,994,540 and U.S. Pat. No. 5,204,439 describe reactive polyurethane/urea adhesive compositions that do not sag when applied onto vertical surfaces. Like most polymeric materials containing urea linkages, these materials are somewhat brittle. These structural adhesives have a relatively high urethane plus urea content and are too brittle for use as contact adhesives for flexible, porous substrates.

U.S. Pat. No. 3,979,364 relates to caulking and sealants that do not sag when applied to vertical surfaces. Materials of this type are typically have a high content of mineral fillers, and are not useful as contact adhesives. The use of low molecular weight (i.e. 400–1500) amine terminated polyethers gives the desirable increase in viscosity upon combining the reactive components, but leads to solid gel particles that are undesirable in contact adhesives.

The polyurethane/urea contact adhesives of the present invention have several advantages. They can be applied to the substrates in liquid form and cured to form a permanently tacky elastomeric layer useful as a contact adhesive. The viscosity of the reacting adhesives is sufficiently high so that the compositions do not soak into porous substrates and thus remain on the surface of the substrate where they maintain their effectiveness as adhesive layers. The adhesives have sufficient flexibility so that they are useful on flexible substrates. Another advantage of the present invention is that the contact adhesives can be attached to and removed from a substrate, and are reusable.

DESCRIPTION OF THE INVENTION

The present invention relates to a method of producing coated substrates comprising applying a contact adhesive composition to a substrate, allowing the contact adhesive to cure, and optionally, placing a release paper on the cured contact adhesive. The contact adhesives of the present invention are polyurethane/urea compositions consisting essentially of a) a polyisocyanate having a functionality of less than about 4; and optionally, b) a polyol component consisting of 1) about 95 to 100% by weight, based on 100% by weight of component b), of at least one polyether polyol having a molecular weight of from about 1800 to 12,000 and an average functionality from about 1.5 to about 4, and 2) up to about 5% by weight, based on 100% by weight of component b), of at least one chain extender having a molecular weight of from about 60 to 400 and an average functionality from about 1.5 to about 3; and c) at least one polyether containing at least two isocyanate-reactive groups and a molecular weight of from about 1800 to about 12,000, wherein at least 50% of the isocyanate-reactive groups are primary and/or secondary amino groups. It is preferred that these polyethers containing at least two isocyanate-reactive groups wherein at least 50% of the isocyanate-reactive groups are primary and/or secondary amino groups and preferably have a functionality of from about 1.5 to 4.0.

The weight ratio of components b) to component c) ranges from about 95:5 to about 0:100, and preferably from about 95:5 to 60:40. The amounts of components a), b), and c) are such that the equivalent ratio of isocyanate groups to isocyanate-reactive groups is from about 85:100 to about 115:100 and the sum of the urethane group content plus the urea group content is from about 1 to about 12%, preferably from about 2–8%, and most preferably from about 3–6%.

The present invention also relates to coated substrates produced by the above described method.

It is a requirement of the present invention that the urea content is sufficient to cause the viscosity of the reacting mixture to increase to greater than about 1000 mPa.s at 25° C., more preferably greater than about 2000 mPa.s at 25° C., immediately after mixing component a) with a blend of components b) and c) in the absence of a urethane forming catalyst.

Since component b) is optional in these contact adhesive compositions, it is possible to have no urethane and only urea groups in the final product. In this embodiment, the urea content may approach about 10% of the total composition. Thus, the range of urea content in the total composition due to amine-terminated polyether in the formulation of the present invention is from about 0.1 to 10%, preferably from about 0.2 to 8%, and most preferably from about 0.3 to 6%. It is particularly preferred that when component b) is not present in the composition, that component a) is selected from the known commercial aliphatic diisocyanates and polyisocyanates.

In cases where b) is present in the composition, it is preferred that the urethane group concentration is from about 2 to about 9%, preferably from about 3–8%, and most preferably from about 4–6%. Correspondingly, in accordance with the ranges set forth in the present invention, the amount of low molecular weight chain extender b) 2) is thus limited to less than about 40 equivalent percent of the isocyanate reactive component mixture b). The ranges for urea group concentration are the same as when b) is not present in the composition.

The urethane group content and urea group content as used herein are defined as follows.

The urethane group content as used herein is defined as:

$$\% \text{ urethane} = \frac{59 \times (\text{OH equivalents}) \times 100}{\text{total weight}}$$

The urea group content as used herein is defined as:

$$\% \text{ urea} = \frac{59 \times (\text{NH equivalents}) \times 100}{\text{total weight}}$$

In a preferred embodiment, the polyisocyanate is selected from the group consisting of 1) a polymethylene poly (phenyl isocyanate) having an isocyanate group content of from 30 to 33% by weight and having a diphenylmethane diisocyanate content of from 30 to 60% by weight, and 2) a mixture of said polymethylene poly(phenyl isocyanate) with a liquid reaction product of 4,4'-methylene bis(phenyl isocyanate), wherein said mixture has an isocyanate group content of from 20 to 30% by weight. It is also preferred that the functionality of the polyisocyanate approaches about 2 when the functionality of the polyol component and/or the polyether containing amino groups approaches about 4.

It is also preferred that the polyethers b)1) have an average molecular weight of about 1800 to about 12,000 and an average functionality of about 2 to 3. It is also preferred that b)1) be selected from the group consisting of diols, triols, and mixtures thereof.

Examples of suitable polyisocyanates which may be used as the polyisocyanate component in accordance with the present invention include monomeric diisocyanates, preferably NCO prepolymers and more preferably polyisocyanate adducts. Suitable monomeric diisocyanates may be represented by the formula

in which R represents an organic group obtained by removing the isocyanate groups from an organic diisocyanate having a molecular weight of about 56 to 1,000, preferably about 140 to 400. Diisocyanates preferred for the process according to the invention are those represented by the above formula in which R represents a divalent aliphatic hydrocarbon group having 4 to 18 carbon atoms, a divalent cycloaliphatic hydrocarbon group having 5 to 15 carbon atoms, a divalent araliphatic hydrocarbon group having 7 to 15 carbon atoms or a divalent aromatic hydrocarbon group having 6 to 15 carbon atoms.

Examples of the suitable organic diisocyanates include 1,4-tetramethylene diisocyanate, 1,6-hexamethylene diisocyanate, 2,2,4-trimethyl-1,6-hexamethylene diisocyanate, 1,12-dodecamethylene diisocyanate, cyclohexane-1,3- and -1,4-diisocyanate, 1-isocyanato-2-isocyanatomethyl cyclopentane, 1-isocyanato-3-isocyanatomethyl-3,5,5-trimethyl-cyclohexane (isophorone diisocyanate or IPDI), bis(4-isocyanatocyclohexyl)methane, 2,4'-dicyclohexylmethane diisocyanate, 1,3- and 1,4-bis (isocyanatomethyl)cyclohexane, bis(4-isocyanato-3-methyl-cyclohexyl)methane, α,α,α',α'-tetramethyl-1,3- and/or -1,4-xylylene diisocyanate, 1-isocyanato-1-methyl-4 (3)-isocyanatomethyl cyclohexane, 2,4- and/or 2,6-hexahydrotoluene diisocyanate, 1,3- and/or 1,4-phenylene diisocyanate, 2,4- and/or 2,6-toluene diisocyanate, 2,4'- and/or 4,4'-diphenylmethane diisocyanate, 1,5-diisocyanato naphthalene and mixtures thereof. Aromatic polyisocyanates containing 3 or more isocyanate groups such as 4,4',4"-triphenylmethane diisocyanate and polymethylene poly (phenylisocyanates) obtained by phosgenating aniline/formaldehyde condensates may also be used.

In accordance with the present invention, at least a portion of the polyisocyanate component may be present in the form of an NCO prepolymer or a polyisocyanate adduct, more preferably a polyisocyanate adduct. Suitable polyisocyanate adducts are those containing isocyanurate, uretdione, biuret, urethane, allophanate, carbodiimide and/or oxadiazinetrione groups. The polyisocyanates adducts have an average functionality of 2 to 4 and an NCO content of 5 to 30% by weight. Suitable adducts/prepolymers include the following type of components:

1) Isocyanurate group-containing polyisocyanates which may be prepared as set forth in DE-PS 2,616,416, EP-OS 3,765, EP-OS 10,589, EP-OS 47,452, U.S. Pat. No. 4,288, 586 and U.S. Pat. No. 4,324,879. The isocyanato-isocyanurates generally have an average NCO functionality of 3 to 4.0, preferably of from 3.2 to 3.6, and an NCO content of 5 to 30%, preferably 10 to 25% and most preferably 15 to 25% by weight.

2) Uretdione diisocyanates which may be prepared by oligomerizing a portion of the isocyanate groups of a diisocyanate in the presence of a trialkyl phosphine catalyst and which may be used in admixture with other aliphatic and/or cycloaliphatic polyisocyanates, particularly the isocyanurate group-containing polyisocyanates set forth under (1) above.

3) Biuret group-containing polyisocyanates which may be prepared according to the processes disclosed in U.S. Pat. Nos. 3,124,605; 3,358,010; 3,644,490; 3,862,973; 3,906, 126; 3,903,127; 4,051,165; 4,147,714; or 4,220,749 by using co-reactants such as water, tertiary alcohols, primary and secondary monoamines, and primary and/or secondary diamines. These polyisocyanates preferably have an NCO content of 18 to 22% by weight and an average NCO functionality of 3 to 3.5.

4) Urethane group-containing polyisocyanates which may be prepared in accordance with the process disclosed in U.S. Pat. No. 3,183,112 by reacting excess quantities of polyisocyanates, preferably diisocyanates, with low molecular weight glycols and polyols having molecular weights of less than 400, such as tripropylene glycol, trimethylol propane, glycerine, 1,2-dihydroxy propane and mixtures thereof. The urethane group-containing polyisocyanates have a most preferred NCO content of 12 to 20% by weight and an (average) NCO functionality of 2.5 to 3.

5) Allophanate group-containing polyisocyanates which may be prepared according to the processes disclosed in U.S. Pat. Nos. 3,769,318, 4,160,080 and 4,177,342. The allophanate group-containing polyisocyanates have a most preferred NCO content of 12 to 21% by weight and an (average) NCO functionality of 2 to 4.

6) Isocyanurate and allophanate group-containing polyisocyanates which may be prepared in accordance with the processes set forth in U.S. Pat. Nos. 5,124,427, 5,208,334 and 5,235,018; the disclosures of which are herein incorporated by reference.

7) Carbodiimide group-containing polyisocyanates which may be prepared by oligomerizing di- or polyisocyanates in the presence of known carbodiimidization catalysts as described in DE-PS 1,092,007, U.S. Pat. No. 3,152,162 and DE-OS 2,504,400, 2,537,685 and 2,552,350.

8) Polyisocyanates containing oxadiazinetrione groups and containing the reaction product of two moles of a diisocyanate and one mole of carbon dioxide.

Preferred polyisocyanate adducts are the polyisocyanates containing urethane groups, isocyanurate groups, biuret groups or mixtures of isocyanurate and allophanate groups.

The NCO prepolymers, which may also be used as the polyisocyanate component in accordance with the present invention, are prepared from the previously described monomeric polyisocyanates or polyisocyanate adducts, preferably monomeric diisocyanates, and organic compounds containing at least two isocyanate-reactive groups, preferably at least two hydroxy groups. These organic compounds include high molecular weight compounds having molecular weights of 400 to about 6,000, preferably 800 to about 3,000, and optionally low molecular weight compounds with molecular weights below 400. The molecular weights are number average molecular weights ($M_n$) and are determined by end group analysis (OH number). Products obtained by reacting polyisocyanates exclusively with low molecular weight compounds are polyisocyanates adducts containing urethane groups and are not considered to be NCO prepolymers.

The polyol component b) to be used in the method according to the invention comprises components b)1) about 95 to 100% by weight, based on 100% by weight of component b), of at least one polyether polyol having an average functionality of from about 1.8 to 4, preferably from about 2 to 3, and a molecular weight of about 1800 to 12,000, preferably from about 2000 to 6000, and b)2) up to about 5% by weight, based on 100% by weight of component b), of at least one chain extender having a molecular weight of from about 60 to 400 and an average functionality of from about 1.5 to 3.

Examples of some suitable high molecular weight polyether polyols for use in accordance with the invention are known and may be obtained, for example, by polymerizing tetrahydrofuran or epoxides such as, for example, ethylene oxide, propylene oxide, butylene oxide, styrene oxide or epichlorohydrin in the presence of suitable catalysts, such as, for example, $BF_3$ or KOH, or by chemically adding these epoxides, preferably ethylene oxide and propylene oxide, in admixture or successively to components containing reactive hydrogen atoms such as water, alcohols or amines. Examples of suitable alcohols and amines include the low molecular weight chain extenders set forth hereinafter, propylene glycol, glycerin, ethylene glycol, triethanolamine, water, trimethylolpropane, bisphenol A, sucrose, aniline, ammonia, ethanolamine and ethylene diamine. Mixtures of these starters are also advantageously used to prepare polyethers with the desired functionality of 1.5 to 4 for the present invention. It is preferred to use polyethers which contain substantial amounts of primary hydroxyl groups in terminal positions (greater than 80% by weight, based on all of the terminal hydroxyl groups present in the polyether).

Polyether polyols including polymers of propylene oxide and copolymers of propylene oxide and ethylene oxide are preferably used as component b)1) in the invention. To assure adequate molecular weight in the final permanently tacky elastomers of the present invention, it is preferred to use polyethers that contain a low amount of unsaturation. This unsaturation is inherent in polyethers prepared using standard anionic polymerization techniques and lead to not only insufficient molecular weight build-up, but also materials that degrade quicker when exposed to the environment.

Polyether polyols with reduced levels of unsaturation are prepared using special techniques described for example in U.S. Pat. Nos. 3,278,457, 3,393,243, 3,829,505, 3,941,849, 4,210,764, 4,355,188, 4,472,560, 4,477,589, 4,721,818, 4,962,237, 5,010,187, 5,070,125, 5,114,619, and 5,266,681, the disclosures of which are herein incorporated by reference.

Preferred polyether polyols include, for example, those based on ethylene oxide and/or propylene oxide with mono-, di-, tri-, or tetra-functional starters such as, for example, methanol, n-butanol, water, ethylene glycol, propylene glycol, glycerin, trimethylolpropane, ethanolamine derivatives and N-substituted ethanolamines including ethanolamine, N-methyl-ethanolamine, diethanolamine, triethanolamine, and ethylenediamine.

As those skilled in the art are aware, polyether polyols are inherently hygroscopic. The water that is inherent in the polyol contributes toward the total urea content in the final polymer. However, water alone, i.e. without an amine based compound, does not provide the required viscosity increase immediately after mixing components a), b) and c) as discussed hereinabove.

Suitable organic diols and triols to be used as component b)2) according to the invention include, for example, diols and triols having a molecular weight of about 60 to 400, preferably about 90 to 300. These compounds include, for example, 2-methyl-1,3-propanediol, ethylene glycol, 1,2- and 1,3-propanediol, 1,3- and 1,4- and 2,3-butanediol, 1,6-hexanediol, 1,10-decanediol, diethylene glycol, triethylene glycol, tetraethylene glycol, dipropylene glycol, tripropylene glycol, glycerol, trimethylolpropane, neopentyl glycol, cyclohexanedimethanol, 2,2,4-trimethylpentane-1,3-diol, ethanolamine derivatives and N-substituted ethanolamines including ethanolamine, N-methyl-ethanolamine, diethanolamine, and triethanolamine. Preferred diols and triols include, for example diethylene glycol, triethylene glycol, dipropylene glycol, tripropylene glycol, and mixtures thereof.

Suitable liquid amine-terminated polyethers (b) according to the invention include polymers containing aromatically bound isocyanate-reactive primary or secondary (preferably primary) amino groups and/or aliphatically bound isocyanate-reactive primary or secondary amino groups and having a molecular weight of from 1,600 to about 12,000, preferably about 1,800 to 12,000, and most preferably about 2,000 to 4,000. Preferred amine-terminated polyethers contain about 2 to about 8 (preferably 2 to 4, and most preferably 2) amino groups and have a molecular weight of from 1,800 to 6,000 (most preferably 2,000 to 4,000). Mixtures of higher functional ones with lower functional ones can be used to assure that the average functionality of the blend is less than about 4. Compounds containing amino end groups can also be attached to the polymer chain through urethane or ester groups. The preferred liquid amine-terminated polymers are liquids at room temperature and have viscosities of less than about 20,000 mPa.s at 25° C. Although solid or higher-viscosity liquid amine-terminated polymers are not themselves suitable, mixtures of amine-terminated polymers containing one or more solid and/or higher-viscosity liquid amine-terminated polymers may be suitable if the mixtures are liquids having appropriate viscosities.

Suitable amine-terminated polyethers can be prepared by any of several methods known in the art. Since most of these methods use hydroxyl-functional polyethers as starting materials, the reactions do not necessarily have to be taken to completion in order to provide amine-terminated polyethers of the present invention, i.e., polyethers having at least two isocyanate reactive groups and a molecular weight of from about 1,800 to about 12,000 in which at least 50% of the isocyanate reactive groups are primary and/or secondary amino groups.

Particularly preferred liquid amine-terminated polymers are amine-terminated polyethers that contain primary amino groups attached to the polyether on an aliphatic hydrocarbon residue. These amine-terminated polyethers are commercially available from the Huntsman Corporation of Houston, Tex. under the trademark Jeffamine®. These amine-terminated polyethers are prepared from polyhydroxypolyethers (e.g., polypropylene glycol ethers) by reaction with ammonia in the presence of hydrogen and catalysts as described in, for example, U.S. Pat. No. 3,654,370, the disclosure of which is herein incorporated by reference, or by hydrogenation of cyanoethylated polyoxypropylene ethers as described in, for example German Patent 1,193,671 and U.S. Pat. No. 3,267,050, the disclosures of which are herein incorporated by reference. Other methods for the preparation of polyoxyalkylene polyamines are described in U.S. Pat. Nos. 3,155,728 and 3,236,895 and French Patent 1,551,605.

Suitable amine-terminated polyethers can be obtained by the hydrolysis of various polymers containing isocyanate and other end groups. For example, in a process disclosed in German Offenlegungschrift 2,948,419, polyethers containing hydroxyl groups (preferably two or three hydroxyl groups) react with polyisocyanates to form isocyanate prepolymers whose isocyanate groups are then hydrolyzed in a second step to amino groups. Preferred amine-terminated polyethers are prepared by hydrolyzing an isocyanate compound having an isocyanate group content of from 0.5 to 40% by weight. Suitable amine-terminated polyethers can be prepared by first reacting a polyether containing two to four hydroxyl groups with an excess of an aromatic polyisocyanate to form an isocyanate terminated prepolymer and then converting the isocyanate groups to amino groups by hydrolysis. Processes for the production of useful amine-terminated polyethers using isocyanate hydrolysis techniques are described in U.S. Pat. Nos. 4,386,218, 4,456,730, 4,472,568, 4,501,873, 4,515,923, 4,525,534, 4,540,720, 4,578,500, and 4,565,645, European Patent Application 97,299, and German Offenlegungsschrift 2,948,419, all the disclosures of which are herein incorporated by reference. Similar products are also described in U.S. Pat. Nos. 4,506,039, 4,525,590, 4,532,266, 4,532,317, 4,723,032, 4,724,252, 4,855,504, and 4,931,595, the disclosures of which are herein incorporated by reference. Relatively high molecular weight compounds containing amino end groups may also be obtained according to U.S. Pat. No. 3,865,791 (believed to correspond to German Offenlegunsschrift 2,546,536) or U.S. Pat. No. 3,865,791, the disclosures of which are herein incorporated by reference, by reacting isocyanate prepolymers based on polyhydroxy polyethers with hydroxyl-containing enamines, aldimines, or ketimines and hydrolyzing the reaction products.

Other suitable amine-terminated polyethers include aminophenoxy-substituted polyethers described, for example, in European Patent Applications 288,825 and 268,849. Aminophenoxy-substituted polyethers can also be prepared, for example, by converting polyether polyols into nitrophenoxy-terminated polyethers (by reaction, for example, with chloronitrobenzenes), followed by hydrogenation. E.g., U.S. Pat. Nos. 5,079,225 and 5,091,582. In a preferred method, aminophenoxy-substituted polyethers are prepared by converting polyether polyols into the corresponding sulfonate derivatives, followed by reaction of the polyether sulfonate with an aminophenoxide.

Suitable amine-terminated polyethers also include aliphatic amine-terminated polyethers prepared by the mesylate method described, for example, in U.S. Pat. No. 5,693,864 (filed Oct. 7, 1992). In a preferred method, polyether polyols are converted into corresponding derivatives having suitable leaving groups (such as halide or sulfonate groups) that in turn react with primary amines to form secondary amine-terminated polyethers.

Other suitable amine-terminated polyethers include aminobenzoic acid esters of polyether polyols described, for example, in U.S. Pat. No. 5,219,973. These aminobenzoate derivatives are prepared by reaction of polyether polyols with meta-nitrobenzoic acid or, preferably, meta-nitrobenzoyl chloride to form corresponding nitrobenzoic acid esters that are then hydrogenated to the amines.

Although generally less preferred, suitable amine-terminated polyethers also include certain aminocrotonate-terminated derivatives of polyethers prepared from acetoacetate-modified polyethers as described, for example, in U.S. Pat. Nos. 5,066,824, 5,151,470, and 5,231,217.

Anthranilic acid esters of relatively high molecular weight polyhydroxy-polyethers (i.e., those based on isatoic acid) as described in, for example, U.S. Pat. Nos. 3,808,250, 3,929,863, 3,975,428, 4,007,239, 4,016,143, 4,169,206, and 4,260,557, the disclosures of which are herein incorporated by reference, are less suitable because they are so unreactive that allow competitive reaction of the diisocyanate with b), the polyether and chain extender blend, and thus do not provide the desired immediate thickening of the reacting mixture.

It is also possible, although much less preferred because of their higher glass transition temperatures and viscosities, to use other amine-terminated polymers such as polyesters, polyacetals, polycarbonates, polyesterethers, polyester carbonates, polythioethers, polyamides, polyesteramides, polysiloxanes, polybutadienes, polyacetones. Mixtures of such polymers with themselves or with the amine-terminated polyethers of the present invention are, of course, also suitable.

Although generally not preferred, the amine-terminated polymers used in the present invention can be used in admixture with smaller quantities (preferably no more than 30 mole-% relative to the amine-terminated polyethers) of other known isocyanate-reactive compounds (besides polyethers b)1) of the present invention), such as hydroxyl-containing polyesters, polyacetals, polycarbonates, polyesterethers, polyester carbonates, polythioethers, polyamides, polyesteramides, polysiloxanes, polybutadienes, and polyacetones (particularly polyether polyols). These mixtures generally should contain (on a statistical average) two to three isocyanate-reactive end groups. These materials are however generally much less preferred because of their higher glass transition temperatures and viscosities.

In accordance with the present invention, when higher amounts of polyethers having primary and/or secondary amino groups comprise at least 50% of the isocyanate reactive groups, it is preferred to use aliphatic isocyanates. It is also necessary to use a catalyst when aliphatic isocyanates are used to assure complete reaction with the remaining hydroxyl-functional portion of the blend.

In accordance with the present invention, it is preferred that components b) and c) are used as a blend and subsequently mixed with component a). Also, it is preferred that one or more catalysts are included in the blend of components b) and c).

Some examples of catalysts suitable for use in accordance with the present invention include catalysts such as, for example, metal carboxylates including, for example, tin carboxylates such as, for example, dimethyltin dilaurate, and bismuth carboxylates, such as, for example, bismuth trineodecanoate. Some suitable examples of metal halides include, for example, tin halides and especially tin chlorides such as, for example, dimethyltin dichloride. Suitable examples of ammonium carboxylates include, for example, trimethylhydroxyethylammonium-2-ethylhexanoate (i.e. Dabco TMR). Tin carboxylates such as, for example, dimethyltin dilaurate, and bismuth carboxylates such as, for example, bismuth trineodecanoate are preferred catalysts. Metal chlorides such as, for example, dimethyltin dichloride are also preferred catalysts.

Suitable catalysts also include, for example, tin-sulfur catalysts. Examples of these catalysts include dialkyltin dilaurylmercaptides such as, for example, dibutyltin dilaurylmercaptide and dimethyltin dilaurylmercaptide. These tin-sulfur catalysts are generally less preferred due to their latent catalytic behavior.

Trialkyl amines and heterocyclic amines are also suitable for the present invention. Suitable compounds include, for example, trimethylamine; triethylamine; tripropylamine; tributylamine; dimethyl cyclohexylamine; dibutyl cyclohexylamine; dimethyl ethanolamine; triethanolamine; diethyl ethanolamine; ethyl diethanolamine; dimethyl isopropanolamine; triisopropanolamine; triethylenediamine, tetramethyl-1,3-butanediamine; N,N,N',N'-tetramethylethylenediamine; N,N,N', N'-tetramethyl-hexanediamine-1,6; N,N,N',N',N"-pentamethyl diethylenetriamine; bis(2-dimethyl-aminoethoxy)methane; N,N,N'-trimethyl-N'-(2-hydroxyethyl ethylenediamine; N,N-dimethyl-N', N'-(2-hydroxyethyl)-ethylenediamine; tetramethylguanidine; N-methylpiperidine; N-ethylpiperidine; N-methylmorpholine; N-ethylmorpholine; 1,4-dimethylpiperidine; 1,2,4-trimethyl-piperidine; N-(2-dimethylaminoethyl)-morpholine; 1-methyl-4-(2-dimethyl-amino)-piperidine; 1,4-diazabicyclo-[2.2.2]-octane; 2-methyl-1,4-diazabicyclo [2.2.2]-octane; quinuclidine; 1,5-diazabicyclo[5.4.0]-5-undecene; and 1,5-diazabicyclo-[4.3.0]-5-nonane.

It is also possible to use heat-activated catalysts for the present invention such as amine salts. Some examples of suitable amine salts include aliphatic and aromatic tertiary amine catalysts. Suitable heat-activated amine salts include compounds such as, for example, DABCO 8154 commercially available from Air Products, a formic acid blocked triethylene diamine, and other delayed action catalysts such as DABCO WT, also commercially available from Air Products; and Polycat SA-1 and Polycat SA-102 which are both acid-blocked versions of 1,8-diazabicyclo[5.4.0] undecene-7 (i.e. Polycat DBU) and commercially available from Air Products.

In another embodiment of the present invention, it is particularly preferred to use a mixture of one or more tin catalyst with one or more amine catalyst.

In addition, it is of course possible that the elastomeric compositions of the present invention include auxiliary agents and additives known in the field of polyurethane chemistry. These include, for example, surfactants, fillers, etc. Higher amounts of additives other than catalysts are generally less preferred because they can reduce the adhesive strength of the highly elastic polyurethane/urea contact adhesives. Although they may contribute greatly to the thickening of the reacting mixtures of the present invention, relatively high amounts of fillers are generally not preferred because they reduce the contact adhesive properties of the permanently tacky elastomers of the present invention.

The adhesive compositions are applied as one or more layers to substrates by known methods such as spraying, brush coating, immersion or flooding or by means of rollers or doctor blade applicators. The adhesive compositions are particularly suitable to adhere certain flexible substrates that are porous, such as, for example, textiles and other woven or nonwoven natural or synthetic fibers, paper and paper products, leather, or wood to various surfaces, e.g., metals, plastics, wood, cement, concrete or glass. The adhesive compositions according to the invention are particularly suitable to attach these porous, flexible substrates onto sheet steel, for example, for the manufacture of car bodies and auto trim, machine trim panels, vats or containers. The surfaces to be coated with the adhesive compositions according to the invention may be treated with suitable primers before the process according to the invention is carried out. The density of adhesives according to the invention can also be lowered by mechanical froth or addition of known blowing agents to the compositions.

After the substrates exemplified above have been coated, the coatings may be cured at either ambient temperature, e.g., by air drying or so-called forced drying, or at elevated temperature. The coated side of the substrate can be protected from prematurely attaching to surfaces or to itself by covering it with coated release papers known to those skilled in the art. The substrates are attached to the surfaces by placing the coated side of the substrate in the desired position on the surface and then exerting pressure on the uncoated side of the substrate.

EXAMPLES

The following materials were used in the examples.

Isocyanate A: a polymethylene poly(phenylisocyanate) containing 43% diphenylmethane diisocyanate monomers and 57% of higher functionality homologs, and having an overall isocyanate group content of about 31.6% and a functionality of 2.8.

Isocyanate B: a 50/50 mixture of a polymethylene poly (phenylisocyanate) containing 64% diphenylmethane diisocyanate monomers and about 36% of higher functionality homologs and a 23% NCO prepolymer of 4,4'-diphenylmethane diisocyanate and tripropylene glycol, having an overall isocyanate group content of about 27% and a functionality of about 2.25.

Isocyanate C: an aliphatic diisocyanate consisting of isomers of bis(4-isocyanatocyclohexyl)methane and an isocyanate group content of about 32%.

Isocyanate D: an aliphatic polyisocyanate having an isocyanate group content of about 21.6% and a functionality of about 3.6 consisting mainly of trimers of 1,6-hexamethylene diisocyanate.

Isocyanate E: an aliphatic diisocyanate consisting of isomers of isophorone diisocyanate having an isocyanate group content of about 38%.

Polyol A: poly(oxyalkylene) polyol having a molecular weight of about 4000 and a functionality of about 2, and prepared by adding a mixture of about 87% propylene oxide and 13% ethylene oxide to propylene glycol such that about 75% of the hydroxyl groups are primary.

Polyol B: a poly(oxyalkylene) polyol having a molecular weight of about 4000 and a functionality of about 2, and prepared by adding a mixture of about 80% propylene oxide and 20% ethylene oxide to propylene glycol such that about 90% of the hydroxyl groups are primary.

Polyol C: a poly(oxyalkylene) polyol having a equivalent weight of about 1600 and a functionality of about 3, and prepared by adding a mixture of about 83% propylene oxide and 17% ethylene oxide to glycerine such that about 85% of the hydroxyl groups are primary.

ATPE A: a difunctional, 4000 molecular weight amine-terminated polypropylene glycol, commercially available from Huntsman Corporation of Houston, Tex. as Jeffamine® D4000.

ATPE B: a difunctional, 2000 molecular weight amine-terminated polypropylene glycol, commercially available from Huntsman Corporation of Houston, Tex. as Jeffamine® D-2000.

ATPE C: an aromatic amine-terminated polyether having a functionality of about 2.6 and an equivalent weight of about 1800 prepared by the hydrolysis of an isocyanate terminated prepolymer that was prepared by the reaction of excess TDI with a 4800 MW ethylenoxide tipped polyoxypropylene triol.

ATPE D: a trifunctional 5000 molecular weight amine-terminated polypropylene glycol, commercially available from Huntsman Corporation of Houston, Tex. as Jeffamine® T-5000.

Catalyst A: dibutyltin dilaurate catalyst, commercially available from Air Products and Chemicals, Inc. as DABCO® T-12.

Catalyst B: 33% triethylene diamine in dipropylene glycol, commercially available from Air Products and Chemicals, Inc. as DABCO® 33LV.

Example 1 (Comparative Example)

7.57 g of Isocyanate A was added to 100 g of Polyol A at room temperature and with stirring. The mixture was stirred for 4 minutes and the viscosity was 840 mPa.s at 26° C. To the mixture 0.1 g of Catalyst A and 0.4 g of Catalyst B was added and stirred for 1 minute, then cast (approx. ⅜ in. thick) into a release paper mold (5 in.×5 in.) at 50° C. The polymer was cured at 50° C. for 16 hours. The polymer was firm, somewhat tough, highly elastic, and tacky. Dirt could be removed from the surface simply by washing with water. The resulting dried polymer retained its original tackiness. It contained about 3.0% urethane and about 0.2% urea based upon the reaction of excess isocyanate with water.

The same mixture was prepared again. After stirring for 30 seconds, the polymer was immediately coated on #8 untreated canvas (commercially available from Wheeling Tent and Awning Company, Wheeling W. Va.) with a #50 wire-wound laboratory coating rod (commercially available from Gardner Testing Instruments, Pompano Beach, Fla.) using the Preparation of Test Specimens and Adhesion Test Procedure (For Peel Strength) below. The sample had a peel strength of 0.4 pounds per linear inch (pli).

Preparation of Test Specimens and Adhesion Test Procedure (For Peel Strength)

A 5 inch×8 inch area of a 6 inch×8 inch canvas (#8) panel was coated with adhesive using a #50 coating rod. The panel was cut in half immediately so that two 6 inch×4 inch panels were obtained and laminated with coated sides facing each other. The samples were cured for 15 minutes at 50° C. with a 15 lb. weight placed on top, then the weight was removed and the sample was cured for an additional 16 hrs. at 50° C. The samples were aged at room temperature for 1 day before softening points were run.

After aging for 1 day, three 6×1 inch strips were cut from the laminated panel, discarding the edges, yielding three 1 inch wide peel samples. The coated samples were pulled back 1 inch. Peel tests were run on a Instron Tester with a crosshead speed of 2 inches per minute.

Example 2

7.48 g of Isocyanate A was added to a mixture of 85 g of Polyol A and 15 g of ATPE A at room temperature and with stirring. The mixture was stirred for 4 minutes and the viscosity was 2,500 mPa.s at 26° C. To the mixture 0.1 g of Catalyst A and 0.4 g of Catalyst B was added and stirred for 1 minute, then cast (approx. ⅜ in. thick) into a release paper old (5 in.×5 in.) at 50° C. The polymer was cured at 50° C. for 16 hours. The polymer was firm, somewhat tough, highly elastic, and tacky. Dirt could be removed from the surface simply by washing with water. The resulting dried polymer retained its original tackiness. It contained about 2.5% urethane and about 0.2% urea based upon the reaction of isocyanate with water and about 0.4% urea based upon the reaction of isocyanate with amine-terminated polyether.

The same mixture was prepared again. After stirring for 30 seconds, the polymer was immediately coated on #8 canvas with a #50 coating rod using the same Preparation of Test Specimens and Adhesion Test Procedure (For Peel Strength) as described above in Example 1. The sample had a peel strength of 1.4 pli.

Example 3

8.19 g of Isocyanate A was added to a mixture of 90 g of Polyol A and 10 g of ATPE B at room temperature and with stirring. The mixture was stirred for 4 minutes and the viscosity was 3,600 mPa.s at 26° C. To the mixture 0.1 g of Catalyst A and 0.4 g of Catalyst B was added and stirred for 1 minute, then cast (approx. ⅜ in. thick) into a release paper mold (5 in.×5 in.) at 50° C. The polymer was cured at 50° C. for 16 hours. The polymer was firm, somewhat tough, highly elastic, and tacky. Dirt could be removed from the surface simply by washing with water. The resulting dried polymer retained its original tackiness. It contained about 2.6% urethane and about 0.2% urea based upon the reaction of isocyanate with water and about 0.5% urea based upon the reaction of isocyanate with amine-terminated polyether.

Example 4 (Comparative Example)

10.8 g of Isocyanate B was added to 125 g of Polyol B at room temperature and with stirring. The mixture was stirred for 4 minutes and the viscosity was 1000 mPa.s at 23.4° C. To the mixture 0.33 g of Catalyst A and 1.3 g of Catalyst B was added and stirred for ½ minute, then cast (approx. 318 in. thick) into a release paper mold (5 in.×5 in.) at 50° C. The polymer was cured at 50° C. for 16 hours. The polymer was firm, somewhat tough, highly elastic, and tacky. Dirt could be removed from the surface simply by washing with water. The resulting dried polymer retained its original tackiness. It contained about 2.8% urethane and about 0.1% urea based upon the reaction of isocyanate with water.

Example 5

8.36 g of Isocyanate B was added to a mixture of 70 g of Polyol B and 30 g of ATPE A at room temperature and with stirring. The mixture was stirred for 4 minutes and the viscosity was 4,400 mPa.s at 30° C. To the mixture 0.1 of Catalyst A and 0.40 g of Catalyst B was added and stirred for 1 minute, then cast (approx. ⅜ in. thick) into a release paper mold (5 in.×5 in.) at 50° C. The polymer was cured at 50° C. for 16 hours. The polymer was firm, somewhat tough, highly elastic, and tacky. Dirt could be removed from the surface simply by washing with water. The resulting dried polymer retained its original tackiness. It contained about 2.0% urethane and about 0.1% urea based upon the reaction of isocyanate with water and about 0.8% urea based upon the reaction of isocyanate with amine-terminated polyether.

Example 6

9.30 g of Isocyanate B was added to a mixture of 90 g of Polyol B and 10 g of ATPE B at room temperature and with stirring. The mixture was stirred for 4 minutes and the viscosity was 1,750 mPa.s at 28° C. To the mixture 0.1 of Catalyst A and 0.40 g of Catalyst B was added and stirred for 1 minute, then cast (approx. ⅜ in. thick) into a release paper mold (5 in.×5 in.) at 50 C. The polymer was cured at 50° C. for 16 hours. The polymer was firm, somewhat tough, highly elastic, and tacky. Dirt could be removed from the surface simply by washing with water. The resulting dried polymer retained its original tackiness. It contained about 2.5% urethane and about 0.2% urea based upon the reaction of isocyanate with water and about 0.5% urea based upon the reaction of isocyanate with amine-terminated polyether.

Example 7

8.60 g of Isocyanate B was added to a mixture of 85 g of Polyol B and 15 g of ATPE C at room temperature and with stirring. The mixture was stirred for 4 minutes and the viscosity was 4,700 mPa.s at 26° C. To the mixture 0.1 of Catalyst A and 0.40 g of Catalyst B was added and stirred for 1 minute, then cast (approx. ⅜ in. thick) into a release paper mold (5 in.×5 in.) at 50° C. The polymer was cured at 50° C. for 16 hours. The polymer was firm, somewhat tough, highly elastic, and tacky. Dirt could be removed from the surface simply by washing with water. The resulting dried polymer retained its original tackiness. It contained about 2.4% urethane and about 0.1% urea based upon the reaction of isocyanate with water and about 0.5% urea based upon the reaction of isocyanate with amine-terminated polyether.

Example 8 (Comparative Example)

8.59 g of Isocyanate C was added to 100 g of Polyol C at room temperature and with stirring. The mixture was stirred for 4 minutes and the viscosity was 750 mPa.s at 24° C. To the mixture 0.46 of Catalyst A and 1.84 g of Catalyst B was added and stirred for 1 minute, then cast (approx. ⅜ in. thick) into a release paper mold (5 in.×5 in.) at 50° C. The polymer was cured at 50° C. for 16 hours. The polymer was firm, somewhat tough, highly elastic, and tacky. Dirt could be removed from the surface simply by washing with water. The resulting dried polymer retained its original tackiness. It contained about 3.3% urethane and about 0.2% urea based upon the reaction of isocyanate with water.

Example 9

8.49 g of Isocyanate C was added to a mixture of 70 g of Polyol C and 30 ATPE D at room temperature and with stirring. The mixture was stirred for 4 minutes and the viscosity was 1700 mPa.s at 28° C. To the mixture 0.46 of Catalyst A and 1.84 g of Catalyst B was added and stirred for 1 minute, then cast (approx. ⅜ in. thick) into a release paper mold (5 in.×in.) at 50° C. The polymer was cured at 50° C. for 16 hours. The polymer was firm, somewhat tough, highly elastic, and tacky. Dirt could be removed from the surface simply by washing with water. The resulting dried polymer retained its original tackiness. It contained about 2.3% urethane and about 0.2% urea based upon the reaction of isocyanate with water and about 0.9% urea based upon the reaction of isocyanate with amine-terminated polyether.

Example 10 (Comparative Example)

10.28 g of Isocyanate D was added to 100 g of Polyol A at room temperature and with stirring. The mixture was stirred for 4 minutes and the viscosity was 900 mPa.s at 27° C. To the mixture 0.3 of Catalyst A and 1.2 g of Catalyst B was added and stirred for 1 minute, then cast (approx. ⅜ in. thick) into a release paper mold (5 in.×5 in.) at 50° C. The polymer was cured at 50° C. for 16 hours. The polymer was firm, somewhat tough, highly elastic, and tacky. Dirt could be removed from the surface simply by washing with water. The resulting dried polymer retained its original tackiness. It contained about 2.8% urethane.

Example 11

10.20 g of Isocyanate D was added to a mixture of 86 g of Polyol A and 14 g of ATPE A at room temperature and with stirring. The mixture was stirred for 4 minutes and the viscosity was 1,600 mPa.s at 27° C. To the mixture 0.3 of Catalyst A and 1.2 g of Catalyst B was added and stirred for 1 minute, then cast (approx. ⅜ in. thick) into a release paper mold (5 in.×5 in.) at 50° C. The polymer was cured at 50° C. for 16 hours. The polymer was firm, somewhat tough, highly elastic, and tacky. Dirt could be removed from the surface simply by washing with water. The resulting dried polymer retained its original tackiness. It contained about 2.4% urethane and about 0.4% urea based upon the reaction of isocyanate with amine-terminated polyether.

Example 12

6.3 g of Isocyanate E was added to a mixture of 50 g ATPE A and 50 g of ATPE C at room temperature and with stirring. The viscosity of the reacting mixture rose rapidly and was not measured. The mixture was stirred for 1 minute, then cast into a release paper mold (5 in.×5 in.) at 50° C. The polymer was cured at 50° C. for 16 hours. The polymer was firm, somewhat tough, highly elastic, and tacky. Dirt could be removed from the surface simply by washing with water. The resulting dried polymer retained its original tackiness. The urea content of the polymer was 2.94%.

Example 13

3.11 g of Isocyanate E was added to a mixture of 25 g ATPE A and 25 g of a 5274 molecular weight trifunctional aromatic amine terminated polyether at room temperature and with stirring. The viscosity of the reacting mixture rose rapidly and was not measured. The mixture was stirred for 1 minute, then cast into a release paper mold (5 in.×5 in.) at 50° C. The polymer was cured at 50° C. for 16 hours. The polymer was firm, somewhat tough, highly elastic, and tacky. Dirt could be removed from the surface simply by washing with water. The resulting dried polymer retained its original tackiness. The urea content of the polymer was 2.92%.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. In a method of producing a coated substrate comprising applying a contact adhesive to a substrate, and allowing the contact adhesive to cure, the improvement wherein said contact adhesive is a polyurethane/urea composition consisting essentially of:
    a) a polyisocyanate or polyisocyanate adduct having a functionality of less than about 4,
    b) a polyol blend consisting of
        1) about 95 to 100% by weight, based on 100% by weight of component b), of at least one polyether polyol having a molecular weight of from about 1800 to 12000 and an average functionality of from about 1.5 to about 4, and
        2) up to about 5% by weight, based on 100% weight of component b), of at least one chain extender containing hydroxyl groups, having a molecular weight of from about 60 to 400 and an average functionality of from about 1.5 to about 3, and
    c) at least one polyether having at least two isocyanate-reactive groups, and a molecular weight of from about 1800 to about 12,000, wherein at least 50% of the isocyanate-reactive groups are primary and/or secondary amino groups,
wherein the weight ratio of component b) to component c) ranges from about 95:5 to about 0:100, and the amounts of components a), b), and c) are such that the equivalent ratio of isocyanate groups to isocyanate-reactive groups is from about 85:100 to about 115:100 and the sum of the urethane group content plus the urea group content is from about 1 to about 12%.

2. The method of claim 1, wherein components a), b), and c) are present in amounts such that the sum of the urethane group content plus the urea group content is from about 2–8%.

3. The method of claim 2, wherein components a), b), and c) are present in amounts such that the sum of the urethane group content plus the urea group content is from about 3–6%.

4. The method of claim 1, wherein components a), b), and c) are present in amounts such that the urea group content is from about 0.1–10%.

5. The method of claim 2, wherein components a), b), and c) are present in amounts such that the urea group content is from about 0.2–8%.

6. The method of claim 3, wherein components a), b), and c) are present in amounts such that the urea group content is from about 0.3–6%.

7. The method of claim 1, wherein said polyurethane/urea composition is prepared by reacting:
    a) an isocyanate selected from the group consisting of:
        1) a polymethylene poly(phenyl isocyanate) having an isocyanate group content of from about 30 to 33% by weight, and a diphenylmethane diisocyanate content of from about 30 to 60% by weight, and
        2) a mixture of i) a polymethylene poly(phenyl isocyanate) having an isocyanate group content of from about 30 to 33% by weight and a diphenylmethane diisocyanate content of from about 30 to 60% by weight, with ii) a liquid reaction product of 4,4'-methylene bis(phenyl isocyanate), wherein said mixture has an isocyanate group content of from about 20 to 30% by weight; with
    b) a polyether polyol selected from the group consisting of polyether diols, polyether triols and mixtures thereof, wherein the molecular weight of said polyether polyol is from about 1,800 to about 12,000, and
    c) a polyether having at least two isocyanate reactive groups and a molecular weight of from about 1,800 to about 12,000 wherein at least 50% of the isocyanate reactive groups are primary and/or secondary amino groups,
wherein the weight ratio of components b) to component c) being from about 95:5 to about 0:100, and wherein the amounts of a), b), and c) are such that the equivalent ratio of isocyanate groups to isocyanate-reactive groups is from about 85:100 to about 115:100 and the sum of urethane content plus urea content is from about 2 to 8%.

8. The method of claim 1, wherein components a), b), and c) are present in amounts such that the urea group content is from about 2–8%, and the urethane group content is about 0%.

9. The method of claim 8, wherein component a) is an aliphatic polyisocyanate or an aliphatic polyisocyanate adduct.

10. The method of claim 1, wherein component c) comprises at least one liquid amine-terminated polyether containing primary amino groups attached to the polyether on an aliphatic hydrocarbon residue.

11. The method of claim 1, wherein component c) comprises an aromatic amine-terminated polyether having a functionality of about 2.6 and an equivalent weight of about 1800, and being prepared by the hydrolysis of an isocyanate-terminated prepolymer prepared by the reaction of excess tolylene diisocyanate with ethylene oxide tipped polyoxypropylene triol.

12. The method of claim 1, wherein a release paper is placed over the cured contact adhesive.

13. A coated substrate produced by the method of claim 1.

* * * * *